US005672642A

United States Patent [19]
Gros

[11] Patent Number: 5,672,642
[45] Date of Patent: Sep. 30, 1997

[54] COMPATIBLE ASPHALT-POLYMER BLENDS

[75] Inventor: William A. Gros, Baton Rouge, La.

[73] Assignee: The Dow Chemical Company, Midland, Mich.

[21] Appl. No.: 608,652

[22] Filed: Feb. 29, 1996

[51] Int. Cl.[6] ............................................. C08L 95/00
[52] U.S. Cl. ............................ 524/68; 524/59; 524/69; 524/70; 524/71
[58] Field of Search ............................ 524/59, 68, 69, 524/70, 71

[56] References Cited

U.S. PATENT DOCUMENTS

| | | | |
|---|---|---|---|
| 3,634,293 | 1/1972 | Bonitz | 524/59 |
| 3,751,389 | 8/1973 | Hotta et al. | 524/59 |
| 3,803,066 | 4/1974 | Petrossi | 524/71 |
| 3,853,799 | 12/1974 | Behling et al. | 524/68 |
| 4,130,516 | 12/1978 | Gagle et al. | 524/68 |
| 4,145,322 | 3/1979 | Maldonado et al. | 524/68 |
| 4,154,710 | 5/1979 | Maldonado et al. | 524/71 |
| 4,225,353 | 9/1980 | Beaudoin et al. | 524/59 |
| 4,240,946 | 12/1980 | Hemersam | 524/71 |
| 4,242,246 | 12/1980 | Maldonado et al. | 524/71 |
| 4,330,449 | 5/1982 | Maldonado et al. | 524/68 |
| 4,412,019 | 10/1983 | Kraus | 524/68 |
| 4,497,921 | 2/1985 | Chang et al. | 524/59 |
| 4,554,313 | 11/1985 | Hagenbach et al. | 525/54.5 |
| 5,070,123 | 12/1991 | Moran | 524/69 |
| 5,288,773 | 2/1994 | Gorbaty et al. | 524/68 |
| 5,314,935 | 5/1994 | Chaverot | 524/68 |
| 5,371,121 | 12/1994 | Bellomy et al. | 524/68 |

FOREIGN PATENT DOCUMENTS

| | | | |
|---|---|---|---|
| 0174795 | 3/1986 | European Pat. Off. | 524/68 |
| 2533935 | 4/1984 | France | 529/69 |
| 3630132 | 3/1988 | Germany | 524/71 |
| 0289052 | 4/1991 | Germany | 524/71 |
| 0289056 | 4/1991 | Germany | 524/71 |
| 4034319 | 5/1991 | Germany | 524/71 |

OTHER PUBLICATIONS

Liang, Zhizong, In Situ Steric Stabilization of Polyethylene Emulsions in Asphalt Binders for Hot-mix Pavement Applications. 81 Colloids and Surfaces 239–250 (1993).

Morrison, Goefferey R., Chlorinated Polyolefins for Asphalt Binder Modification. 54 Juornal of Applied Polymer Science 231–240 (1994).

*Primary Examiner*—Peter A. Szekely

[57] ABSTRACT

The invention is a process for the preparation of storage stable asphalt-polymer blends, comprising:
 a. contacting sulfur with asphalt; and
 b. contacting a polymer with the sulfur-asphalt mixture under conditions such that a compatible and homogeneous polymer-asphalt blend is formed.

The process of the invention allows the preparation of compatible asphalt-polymer blends that are more stable while utilizing a more cost efficient, faster process and still maintaining the desired physical properties of good weatherability and creep resistance.

12 Claims, 1 Drawing Sheet

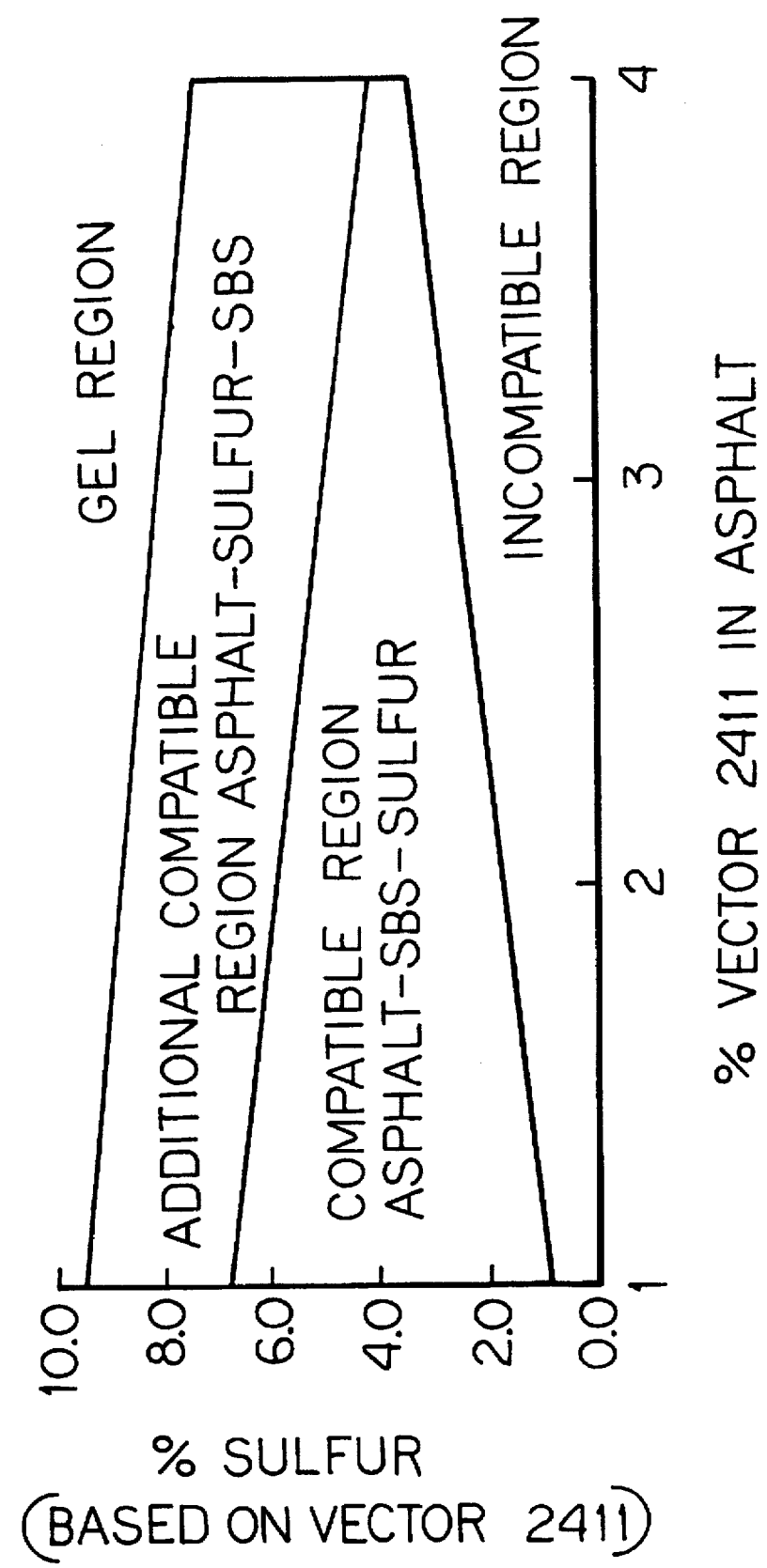

COMPATIBLE ASPHALT-POLYMER BLENDS

BACKGROUND OF THE INVENTION

The invention relates to a process for preparing a compatible asphalt and polymer blend.

The asphalt-polymer blends of the invention are useful for paving materials, roofing materials, products for protection of car bottoms and other coating applications. Asphalt-polymer blends must have good phase compatibility between the asphalt and the polymer, and must be storage stable at high temperature for ease of handling and application. Asphalt-polymer blends can impart better performance to the asphalt with respect to flexibility, longevity, elasticity, and thermal stability for use as paving or coating material.

U.S. Pat. No. 4,240,946 discloses a method for preparing asphalt-polymer mixtures that avoid phase separation by high-shear continuous mixing of the asphalt-polymer mixture. However, this method does not solve the problem of compatible blends because once the high shear mixing stops, the phases begin to separate. U.S. Pat. No. 5,070,123 discloses asphalt contacted with an inorganic acid prior to adding the polymer. The addition of the inorganic acid enhances the storage stability of the asphalt-polymer mixture, however, the storage stability can still be further improved without the use of corrosive acid. U.S. Pat. No. 4,330,449 discloses an asphalt and polystyrene-carboxylated polybutadiene copolymer blend to which elemental sulfur is subsequently added in order to enhance the storage stability of the asphalt-polymer mixture.

What is needed is a process for making storage stable asphalt-polymer blends that are more cost efficient, and a process which prepares asphalt-polymer blends that are phase stable over a broader concentration range of sulfur and polymer and are easier to work with than current blends, while still maintaining the desired creep and rutting resistance.

SUMMARY OF THE INVENTION

The invention is a process for the preparation of storage stable asphalt-polymer blends, comprising:

a. contacting sulfur with asphalt; and b. contacting a polymer with the sulfur-asphalt mixture under conditions such that a compatible and homogeneous polymer-asphalt blend is formed.

The process of the invention allows the preparation of compatible asphalt-polymer blends that are phase stable while utilizing a cost efficient, faster process and still maintaining the desired physical properties of good creep and rutting resistance.

DESCRIPTION OF FIGURES

FIG. 1 is a graph of the improved compatibilization of the asphalt-polymer blend with percent sulfur versus percent polymer in asphalt.

DETAILED DESCRIPTION OF THE INVENTION

Preferably, the asphalt useful in the invention is any asphalt commonly used in industry for construction or adhesive applications, for example, asphalts useful for roofing, paving, adhesive and coating applications. Preferably, the asphalt used has an atmospheric boiling point of at least about 380° C., more typically of at least about 440° C., and an asphaltene content of between about 5 and about 30 weight percent as determined by ASTM D4124, wherein asphaltene is a component of the bitumen in asphalt that is soluble in carbon disulfide but insoluble in paraffin naphthas. The asphalt used in this invention may be obtained from a variety of sources, for example, straight-run vacuum residue; mixtures of vacuum residue with diluents such as vacuum tower wash oil, paraffin distillate, aromatic and naphthenic oils, and mixtures thereof; oxidized vacuum residues or oxidized mixtures of vacuum residues and diluent oils; and the like. Other asphaltic materials such as coal tar pitch, rock asphalt, and naturally occurring asphalt may also be used. The amount of asphalt necessary must be sufficient to impart the desired adhesiveness, hydrophobicity and weatherability to the final asphalt-polymer blend. In asphalt-polymer blend paving applications, the asphalt will typically comprise preferably about 93 weight percent or greater, more preferably about 94 weight percent or greater and even more preferably about 95 weight percent or greater of the final asphalt-polymer blend. The asphalt will typically comprise preferably about 99 weight percent or less, more preferably about 98 weight percent or less and even more preferably about 97 weight percent or less of the final asphalt-polymer blend.

The process of the invention involves contacting elemental sulfur with asphalt to form a blend. The pretreatment of the asphalt with sulfur widens the asphalt-polymer compatibilization area as compared to the method of sulfur treatment of previous asphalt-polymer blends, for example, as disclosed in U.S. Pat. No. 4,145,322, wherein compatibilization means stabilization of the mixture such that it does not separate. The widening of the compatibilization area means that more sulfur can be added to the asphalt, as demonstrated in FIG. 1, without resulting in gellation of the blend, while still maintaining the desirable characteristics of asphalt-polymer blends such as creep and rutting resistance. Creep resistance means the asphalt-polymer blend maintains its shape without deformation even at extreme temperature conditions when the material is subjected to stress. FIG. 1 shows the percent sulfur in the polymer versus the percent polymer in the asphalt and clearly demonstrates the additional range in which sulfur permits compatibility between the asphalt and the polymer. The figure demonstrates that by pre-treating the asphalt with the sulfur, the increased compatiblization range is bounded by 1 to 4 weight percent polymer and 0.1 to about 0.4 weight percent sulfur, both based on the weight of the asphalt-polymer blend.

The sulfur can be contacted with the asphalt by any conventional means known to one skilled in the art. The sulfur can be added slowly to molten asphalt under mixing conditions. The time of addition of the sulfur and subsequent mixing of the asphalt with the sulfur should be sufficient to ensure an effective dispersion and subsequent interaction of the sulfur with the asphalt. Preferably, the time of addition and subsequent mixing of sulfur into the asphalt can be about 5 minutes or greater, more preferably about 10 minutes or greater, and even more preferably about 30 minutes or greater. Preferably, the time of addition and mixing can be about 120 minutes or less, more preferably about 60 minutes or less, and even more preferably about 40 minutes or less. The sulfur content of the asphalt is preferably sufficient to improve the cross-linking between the asphalt and the polymer but not so much as to hinder the ease of handling and application of the asphalt-polymer blend due to gel formation. The amount of sulfur is preferably about 0.01 weight percent or greater, more preferably about 0.075 weight percent or greater and even more preferably about 0.16 weight percent or greater based on the weight of the asphalt-polymer blend. The amount of sulfur added is preferably about 0.1 weight percent or less, more preferably about 0.225 weight percent or less, and even more preferably about 0.3 weight percent or less based on the weight of the asphalt-polymer blend.

The temperature of the asphalt during addition and mixing of the sulfur into the asphalt should be a temperature at which the blend is handleable. Preferably, the temperature is about 120° C. or greater, more preferably about 140° C. or greater, and even more preferably about 160° C. or greater. Preferably the temperature is about 200° C. or less, more preferably about 190° C. or less and even more preferably about 180° C. or less.

Following sulfur addition, a polymer is then added to the sulfur-treated asphalt to form a sulfur-treated polymer-modified asphalt that has enhanced phase stability. A wide variety of polymers may be used in this invention to provide the desired characteristics of the asphalt-polymer blend of excellent creep and rutting resistance. The polymer is a urethane, polyester, styrenic or olefin thermoplastic elastomer. Preferred polymers are thermoplastic elastomers with residual unsaturation. More preferred polymers include thermoplastic styrenic elastomers. Even more preferred polymers include monoalkenyl arene-conjugated diene block copolymers. Monoalkenyl arene-conjugated diene block copolymers preferably corresponding to the formula A-B-A or A-B wherein A comprises units derived from one or more monoalkenyl arenes and B comprises units derived from one or more conjugated dienes. Tapered or partially hydrogenated block copolymers may also be used. Most preferred polymers include styrene-butadiene-styrene and styrene-isoprene-styrene triblock copolymers and styrene-butadiene and styrene-isoprene diblock copolymers. Conjugated dienes useful in the block copolymer include straight- and branched-chain aliphatic hydrocarbons containing two double bonds attached to adjacent carbon atoms. Preferred dienes contain 4 to 6 carbon atoms and include butadiene, isoprene, 1,3-pentadiene, 1,3-hexadiene, 2,3-diemthylbutadiene and mixtures thereof. More preferably, such conjugated dienes contain from about 4 to about 5 carbon atoms and include, for example, butadiene, isoprene, cis-1,3-pentadiene, trans-1,3-pentadiene and mixtures thereof. The most preferred dienes are butadiene and isoprene. Monoalkenyl arenes useful in this invention include compounds having an aromatic ring, preferably monocyclic, with an alkenyl moiety bound thereto which is capable of polymerizing under anionic conditions. Preferred monoalkenyl arenes correspond to the formula:

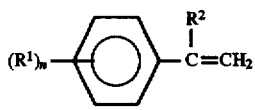

where n is an integer from 0 to 3, $R^1$ is hydrogen an alkyl moiety containing up to 5 carbon atoms and $R^2$ is hydrogen or methyl. Preferred monoalkenyl arenes are styrene or alkyl-substituted styrenes such as vinyl toluene (all isomers, alone or in admixture), alpha-methylstyrene, 4-tertiarybutylstyrene, 4-methylstyrene, 3,5-diethylstyrene, 3,5-di-n-butylstyrene, 4-(4-phenyl-n-butyl)styrene, 2-ethyl-4-benzylstyrene, 4-cyclohexylstyrene, 4-n-propylstyrene, 4-dodecylstyrene, mixtures thereof, and the like. More preferred monoalkenyl arenes include styrene, vinyl toluene, alpha-methylstyrene and mixtures thereof. An even more preferred alkenyl arene is styrene. Preferably, the amount of monoalkenyl arenes in the final block copolymer is 5 percent or greater, more preferably 10 percent or greater, and most preferably 14 percent or greater. Preferably, the percentage of monoalkenyl arenes in the final block copolymer is 50 percent or less, more preferably 45 percent or less, even more preferably 40 percent or less and most preferably 30 percent or less. Preferably, the molecular weight of the polymers is about 50,000 weight average molecular weight or greater, more preferably about 170,000 weight average molecular weight or greater and even more preferably about 200,000 weight average molecular weight or greater. Preferably, the molecular weight of the polymers is about 300,000 weight average molecular weight or less, more preferably about 270,000 weight average molecular weight or less and even more preferably about 250,000 weight average molecular weight or less.

The polymer can be added in an amount sufficient to impart improved creep and rutting resistance. Preferably, the amount of polymer added for a road paving application is about 1.0 weight percent or greater, more preferably about 2.0 weight percent or greater and even more preferably about 3.0 weight percent or greater based on the weight of the asphalt-polymer blend. Preferably, the amount of polymer added is about 10 weight percent or less, more preferably about 8 weight percent or less and even more preferably about 6 weight percent or less based on the weight of the asphalt-polymer blend.

The polymer is added under any conditions conventionally used by those skilled in the art. Preferably, the polymer can be added to the asphalt-sulfur mixture and mixed using high shear mixing over a period of time in order to ensure good blending and cross-linking of the polymer with the asphalt-sulfur mixture. Preferably, the polymer can be added over a period of about 1 minute or greater, more preferably about 3 minutes or greater and even more preferably about 5 minutes or greater. Preferably, the polymer can be added over a period of 10 minutes or less, more preferably about 7 minutes or less and even more preferably about 5 minutes or less. The polymer can be added to the asphalt-sulfur mixture at a temperature sufficient to allow handleability of the asphalt but below a temperature at which the polymer will degrade. Preferably, the temperature is about 120° C. or greater, more preferably about 140° C. or greater, and even more preferably about 160° C. or greater. Preferably, the temperature is about 200° C. or less, more preferably about 190° C. or less and even more preferably about 180° C. or less. Preferably, once the polymer addition is complete, the sulfur-treated asphalt-polymer mixture is mixed for about 5 minutes or greater, more preferably about 10 minutes or greater and even more preferably about 15 minutes or greater under conditions of low shear mixing. Preferably, once the polymer addition is complete, the sulfur-treated asphalt-polymer mixture is mixed for about 60 minutes or less, more preferably about 40 minutes or less and even more preferably about 30 minutes or less under conditions of low shear mixing.

The contacting of the asphalt with the polymer may be achieved by any method conventionally used by one skilled in the art. For example, external mixers, roll mills, internal mixers, Banbury mixers, screw extruders, augers, and the like may be used. The contacting may preferably be performed under atmospheric conditions. Preferably, once the mixing is complete, the asphalt-polymer mixture can be stored in tanks and containers at elevated temperatures at which the blend is molten and flowable.

The sulfur-treated asphalt-polymer blend may be used in any application requiring asphalt-based products with a phase stability requirement. The asphalt useful in the invention is any asphalt commonly used in industry for construction or adhesive applications, for example, such uses can include adhesives, coatings, fabricated products, road and roofing applications, sealants, sound and vibration dampening products, and water proofing membranes.

ILLUSTRATIVE EMBODIMENTS OF THE INVENTION

The following examples are provided to illustrate the invention, but are not intended to limit the scope thereof. All parts and percentages are by weight unless otherwise indicated.

EXAMPLE 1

The prescribed amount of elemental sulfur is added to the asphalt and allowed to react under low shear stirring at 170° C. to 180° C. for 30 minutes. This pretreated asphalt is then removed to a Silverson high shear blender where the styrene-butadiene-styrene (Vector™ 2411 block copolymer available from Dexco Polymers) is milled into the asphalt at 3500 to 4000 rpm at 170° C. to 180° C. The asphalt-polymer blend was prepared by addition of 2 to 4 weight percent polymer to 600 grams of asphalt. After 30 minutes of high shear blending, the blend is mixed under low shear for 30 minutes at 300 rpm at 170° C. to 180° C. Samples of the blend are then removed for compatibility testing.

EXAMPLE 2

Asphalt is maintained at 170° C. to 180° C. while the styrene-butadiene-styrene (Vector™ 2411 block copolymer available from Dexco Polymers) is milled into the asphalt using a Silverson high shear blender operated at 3500 to 4000 rpm. The asphalt-polymer blend was prepared by addition of 2 to 4 weight percent polymer to 600 grams of asphalt. High shear mixing is continued for 30 minutes followed by low shear mixing at 170° C. to 180° C. using a paddle-type mixer at 300 rpm. After 30 minutes of low shear mixing, the prescribed amount of elemental sulfur is added to the blend and the low shear blending is continued at 170° C. to 180° C. for an additional 30 minutes. Samples of the blend are then removed for compatibility testing.

Test Methods

For compatibility testing, 35 grams of the blend are poured into a 2 mm(d)×140 mm(l) aluminum cigar tube. The tube is capped and then placed in a circulating air oven set at 160° C. for 72 hours. The tube is then removed and allowed to cool to room temperature. The asphalt is removed by placing the tube in contact with dry ice which contracts the asphalt and allows for peeling of the aluminum tube from the asphalt. The resulting cylinder of asphalt is cut at the midpoint and the top and bottom softening points are determined. A difference between the top and bottom softening point of equal to or more than 1.66° C. (5.0° F.) indicates that the blend is incompatible and the polymer is separated.

The following tables show the compatibility test results for blends made according to Example 1 and Example 2. Blends were prepared by addition of 2 to 4 weight percent polymer to 600 grams of asphalt.

TABLE 1

Exxon Billings Asphalt

| Percent SBS | Percent Sulfur | Softening Point Difference (°F.) (Top-Bottom) | |
|---|---|---|---|
| | | Example 1 | Example 2 |
| 2.0 | 0.0 | | 10.6 (I) |
| 2.0 | 1.0 | 8.2 (I) | −0.6 (C) |
| 2.0 | 5.0 | | −0.2 (C) |
| 2.0 | 7.0 | 0.7 (C) | GEL |
| 3.0 | 0.0 | | 38.9 (I) |
| 3.0 | 1.0 | 36.2 (I) | 40.7 (I) |
| 3.0 | 5.0 | 0.5 (C) | 9.0 (I) |
| 3.0 | 7.0 | 0.4 (C) | GEL |
| 4.0 | 0.0 | | 52.7 (I) |
| 4.0 | 1.0 | 46.2 (I) | 47.2 (I) |
| 4.0 | 5.0 | 2.1 (C) | GEL |
| 4.0 | 7.0 | 0.5 (C) | GEL |

(I) = Incompatible
(C) = Compatible

TABLE 2

Chevron El Paso Asphalt

| Percent SBS | Percent Sulfur | Softening Point Difference (°F.) (Top-Bottom) | |
|---|---|---|---|
| | | Example 1 | Example 2 |
| 2.0 | 0.0 | | 5.0 (I) |
| 2.0 | 2.0 | −2.2 (C) | 3.9 (C) |
| 2.0 | 5.0 | 2.8 (C) | GEL |
| 2.0 | 8.0 | −0.6 (C) | GEL |
| 3.0 | 0.0 | | 37.2 (I) |
| 3.0 | 2.0 | 17.8 (I) | 11.7 (I) |
| 3.0 | 5.0 | 0.6 (C) | GEL |
| 3.0 | 8.0 | 0.0 (C) | GEL |

(I) = Incompatible
(C) = Compatible

What is claimed is:

1. A process for the preparation of a compatible polymer-asphalt blend, comprising:

a. contacting sulfur with asphalt; and b. contacting a polymer with the sulfur-asphalt mixture under conditions such that a compatible and homogeneous polymer-asphalt blend is formed.

2. The process of claim 1 wherein the amount of sulfur is between about 0.01 weight percent to about 0.3 weight percent by weight of the asphalt-polymer blend.

3. The process of claim 2 wherein the sulfur and asphalt are mixed for about 60 minutes or less and the mixing is performed at about 120° C. to about 200° C.

4. The process of claim 3 wherein the polymer is urethane, polyester, styrenic or olefin thermoplastic elastomer.

5. The process of claim 4 wherein the polymer is any thermoplastic styrenic elastomer.

6. The process of claim 5 wherein the polymer is any styrenic conjugated diene block polymer.

7. The process of claim 6 wherein the polymer is styrene-butadiene-styrene, styrene-isoprene-styrene, styrene-butadiene or styrene-isoprene.

8. The process of claim 7 wherein the polymer is styrene-butadiene-styrene.

9. The process of claim 8 wherein the amount of polymer is between about 1.0 weight percent to about 10 weight percent by weight of asphalt-polymer blend.

10. The process of claim 9 wherein the polymer-sulfur-asphalt mixture is mixed for about 60 minutes or less.

11. The process of claim 10 wherein the blending of the polymer and asphalt is performed at about 150° C. to about 200° C.

12. The process of claim 11 wherein the amount of sulfur is about 0.01 weight percent to about 0.3 weight percent, the amount of asphalt is about 90 weight percent to about 99 weight percent and the amount of polymer is about 1.0 weight percent to about 10 weight percent, all based on the weight of the asphalt-polymer blend.

* * * * *